(12) United States Patent
Greene et al.

(10) Patent No.: US 8,357,747 B2
(45) Date of Patent: Jan. 22, 2013

(54) POLYMER COMPOSITIONS COMPRISING FLUORO ELASTOMERS AND EXPANDED PERLITE

(75) Inventors: Michael Greene, Santa Barbara, CA (US); Roger Norman Rothon, Chester (GB); Nigel Julian Keith Danvers, Paris (FR); Qingchun Hu, Lompoc, CA (US)

(73) Assignee: Imerys Filtration Minerals, Inc., San Jose, CA (US)

( * ) Notice: Subject to any disclaimer, the term of this patent is extended or adjusted under 35 U.S.C. 154(b) by 595 days.

(21) Appl. No.: 12/521,574

(22) PCT Filed: Dec. 28, 2007

(86) PCT No.: PCT/GB2007/005018
§ 371 (c)(1),
(2), (4) Date: Jul. 15, 2009

(87) PCT Pub. No.: WO2008/081173
PCT Pub. Date: Jul. 10, 2008

(65) Prior Publication Data
US 2010/0317789 A1  Dec. 16, 2010

Related U.S. Application Data

(60) Provisional application No. 60/877,643, filed on Dec. 29, 2006.

(51) Int. Cl.
*C08K 3/40* (2006.01)
(52) U.S. Cl. ......... 524/494; 524/546; 524/545; 524/544
(58) Field of Classification Search .................. 524/494, 524/546, 545, 544
See application file for complete search history.

(56) References Cited

U.S. PATENT DOCUMENTS

| | | | |
|---|---|---|---|
| 3,668,168 A * | 6/1972 | Self | 524/440 |
| 6,441,079 B2 | 8/2002 | Sato et al. | |
| 6,712,898 B2 | 3/2004 | Palm et al. | |
| 7,138,470 B2 | 11/2006 | Fukushi et al. | |
| 7,497,903 B2 | 3/2009 | Wang et al. | |
| 2003/0125463 A1 | 7/2003 | Tatsu et al. | |
| 2006/0075930 A1 | 4/2006 | Wang et al. | |

FOREIGN PATENT DOCUMENTS

| | | |
|---|---|---|
| CN | 1 544 552 A | 11/2004 |
| EP | 1 400 563 A1 | 3/2004 |
| EP | 1 591 479 A1 | 11/2005 |
| EP | 1 598 402 A1 | 11/2005 |
| GB | 1186245 | 4/1970 |
| JP | 60-184539 A2 | 9/1985 |
| JP | 2000-50467 A2 | 2/2000 |
| JP | 2003-253141 * | 9/2003 |
| JP | 2005-036198 * | 2/2005 |
| JP | 2005-36198 A2 | 2/2005 |
| WO | WO-2008/053236 A1 * | 5/2008 |
| WO | WO 2008/081173 A1 | 7/2008 |
| WO | WO-2008/081173 A1 * | 7/2008 |

OTHER PUBLICATIONS

Öktem, G. Akin and Tincer, T., "A study on the yield stress of perlite-filled high-density polyethylenes", Journal of Materials Science, vol. 28, 1993, pp. 6313-6317.*
Moran, A.L., "Viton A—Effect of Fillers on Heat and Fluid Resistance", Rubber World, vol. 137, No. 2, Nov. 1957, pp. 250-254, 258.
Öktem, G. Akin and Tincer, T., "A study on the yield stress of perlite-filled high-density polyethylenes", Journal of Materials Science, vol. 28, 1993, pp. 6313-6317.
International Search Report and Written Opinion for related PCT Application No. PCT/GB2007/005018, dated Mar. 11, 2008.
International Search Report and Written Opinion for PCT/GB2007/005018.

* cited by examiner

*Primary Examiner* — Peter D. Mulcahy
*Assistant Examiner* — Henry Hu
(74) *Attorney, Agent, or Firm* — Finnegan, Henderson, Farabow, Garrett & Dunner, L.L.P

(57) ABSTRACT

The present invention describes polymer compositions comprising fluoroelastomer and expanded perlite and uses thereof.

15 Claims, No Drawings

POLYMER COMPOSITIONS COMPRISING FLUORO ELASTOMERS AND EXPANDED PERLITE

This application is a national stage entry of and claims the benefits and rights of priority to PCT International Application No. PCT/GB2007/005018 filed Dec. 28, 2007, and claims priority to U.S. Provisional Application No. 60/877,643 filed Dec. 29, 2006, both of which are incorporated by reference herein in their entireties.

The present invention relates to polymer compositions comprising fluoroelastomer and expanded perlite, to processes for the production thereof, to articles formed from the polymer compositions comprising fluoroelastomer and expanded perlite, and to uses of the polymer compositions comprising fluoroelastomer and expanded perlite.

BACKGROUND OF THE INVENTION

Fluoroelastomers are a class of synthetic rubbers which provide high levels of resistance to chemicals, fuels, oils and heat. The heat stability and oil resistance of these materials are generally considered to be due to the high ratio of fluorine to hydrogen, the strength of the carbon-fluorine bond, and the absence of unsaturation. Fluoroelastomers are used, for example, as lining in fuel lines, and, as such, their fuel barrier properties are an important factor.

Minerals and other inorganic materials are often used as fillers in fluoroelastomers, principally to reduce the cost of these high value compounds. For example, EP 1591479 A1 describes a fluoroelastomer composition comprising carbon black as filler. US 2003/0125463 A1 and U.S. Pat. No. 7,138,470 describe fluoroelastomer compositions comprising inorganic fillers such as barium sulfate, wollastonite, silica, carbon black and titanium dioxide.

Whilst inexpensive filler materials are available, it would be desirable to provide further fluoroelastomer compositions comprising alternative, preferably inexpensive, filler materials having desirable properties across a variety of end uses, whilst preserving, or even improving upon, the general physical, mechanical and chemical properties of the fluoroelastomer compositions.

SUMMARY OF THE INVENTION

According to a first aspect of the present invention, there is provided a polymer composition comprising fluoroelastomer and expanded perlite.

According to a second aspect of the present invention, there is provided a process for preparing a polymer composition comprising fluoroelastomer and expanded perlite, said process comprising combining fluoroelastomer with expanded perlite.

In a third aspect, the present invention is directed to the use of expanded perlite in a polymer composition comprising fluoroelastomer.

In a fourth aspect, the present invention provides articles formed from, or formable from, a polymer composition comprising fluoroelastomer and expanded perlite.

In a sixth aspect, the present invention is directed to the use of expanded perlite in a polymer composition comprising fluoroelastomer, for the purpose of preserving or improving upon one or more of the physical, mechanical, thermal and/or electrical properties of the fluoroelastomer.

DETAILED DESCRIPTION OF THE INVENTION

As stated above, the present invention, relates to a polymer composition comprising fluoroelastomer and expanded perlite.

The expanded perlite employed in the present invention is derived from perlite ore, which belongs to the class of natural glasses, commonly referred to as volcanic glasses, which are formed by the rapid cooling of siliceous magma and lava.

Perlite ore is a hydrated natural glass containing typically about 72-75% $SiO_2$, 12-14% $Al_2O_3$, 0.5-2% $Fe_2O_3$, 3-5% $Na_2O$, 4-5% $K_2O$, 0.4-1.5% $CaO$ (by weight) and small concentrations of $MgO$, $TiO_2$ and other metallic elements. Perlite ore is distinguished from other natural glasses by a higher content (2-10% by weight) of chemically bonded water, the presence of a vitreous, pearly luster, and characteristic concentric or arcuate onion skin-like (i.e., perlitic) fractures.

The polymer composition may comprise expanded perlite in an amount of at least about 15% by weight, at least about 20% by weight, at least about 25% by weight, at least about 30% by weight, at least about 35% by weight, at least about 40 by weight, at least about 45% by weight, at least about 50% by weight, at least about 55% by weight, at least about 60% by weight, based on the total weight of the composition. In another embodiment of the invention, the polymer composition comprises expanded perlite in an amount of from about 15% to about 60% by weight, based on the total weight of the composition.

In embodiments of the invention, the value of $d_{50}$ of the expanded perlite may be less than about 100 μm, less than about 80 μm, less than about 60 μm, less than about 40 μm, less than about 30 μm, less than about 25 μm, less than about 20 μm, less than about 15 μm, less than about 10 μm, less than about 8 μm, less than about 6 μm, or less than about 3 μm. The value of $d_{50}$ may be as low as 1 μm, or even as low as 0.5 μm. The value of $d_{50}$ of the expanded perlite may be between about 3 μm and about 60 μm, for example, between about 6 μm and about 40 μm, between about 6 μm and about 30 μm, or between about 10 μm and about 25 μm.

All particle size values pertaining to the particulate perlite are specified as equivalent spherical diameters, and are determined by laser light particle size analysis using a Leeds and Northrup Microtrac X100 (LNM X100) available from Leeds and Northrup, North Wales, Pa., USA. In this technique, the size of particles in powders, suspensions and emulsions may be measured using the diffraction of a laser beam, based on application of either Fraunhofer or Mie theory. In the present invention, Mie theory is applied. The term "mean particle size" or "$d_{50}$" used herein is the value, determined in this way, of the particle diameter at which there are 50% by volume of the particles which have a diameter less than the $d_{50}$ value. The term $d_{90}$ is the particle size value less than which there are 90% by volume of the particles which have a diameter less than the $d_{90}$ value. The preferred sample formulation for measurement of particle sizes is a suspension in a liquid. The LNM X100 instrument normally provides particle size data to two decimal places, to be rounded up or down when determining whether the requirements of the present invention are fulfilled, or by other methods which give essentially the same result.

In embodiments of the invention, the expanded perlite may have an aspect ratio of about 1:1 to about 1:50, about 1:2 to about 1:35, or about 1:5 to about 1:20. Aspect ratios can be calculated by the Sphericity Model from experimentally determined (using electron microscopy) surface area data as described in U.S. Pat. No. 5,846,309.

Process conditions for preparing expanded perlite are disclosed in US Patent Application Publication No. 2006/0075930, the entire contents of which are hereby incorporated by reference. Generally, the expanded perlite employed in the compositions of the present invention can be prepared by methods which include crushing, grinding, milling screening and thermal expansion. For example, perlite ore is crushed, ground and separated to a predetermined particle size range. The separate material can then be heated in air, typically at a temperature of 870-1100° C. in an expansion surface. The expanded perlite can be prepared using conventional crushing, grinding and milling techniques, and can be separated to meet particle size requirements using conventional separating techniques.

The expanded perlite particles may be surface treated to modify one or more properties of the perlite. The surface treatment agents can aid in the handling of the perlite as well as providing improved interaction between the perlite and the fluoroelastomer matrix.

The surface of the perlite particles may be surface modified by a silanization agent. The surface of the perlite particles may be surface modified by a silanization agent in order to increase the hydrophobic or hydrophilic properties of the particles of perlite.

Silanization agents which are suitable for increasing the hydrophobic properties of the perlite particles may be selected from one or more of dimethyldichlorosilane, hexadimethylsilazane, butyltrichlorosilane, hexyltrichlorosilane, octyltrichlorosilane, octylmethyldichlorosilane, decyltrichlorosilane, dodecyltrichlorosilane, tridecyltrichlorosilane, dihexyldichlorosilane, dioctyldichlorosilane, octadecyltrichlorosilane, tributylchlorosilane, octyltrialkoxysilanes such as, for example, octyltriethoxysilane and octyltrimethoxysilane, chloropropyltrialkoxysilanes such as, for example, chloropropyltrimethoxysilane and chloropropyltriethoxysilane, polydimethylsiloxane, 3-methacryloxypropyltriethoxysilane, vinyl trialkoxysilanes such as, for example, vinyl trimethoxy silane, vinyl triethoxy silane and vinyl triisopropoxy silane, and mixtures thereof. The vinyl functionalized silanes may also provide reactive sites for crosslinking of the filler with the polymer.

Silanization agents which are suitable for increasing the hydrophilic properties of the perlite particles may be selected from one or more of trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, tributoxysilyl octyl amine, and mixtures thereof.

Other agents suitable for increasing the hydrophilic properties of the perlite particles include triethanolamine (TEA), 2-amino-2-methyl-1-propanol, AMP-95™ (2-amino-2-methyl-1-propanol formulation containing 5% water), and mixtures thereof.

The polymer compositions of the present invention may be compounded with other components or additives, such as, for example, titanium dioxide, carbon black, iron oxides, zinc oxide, alumina trihydrate, calcium sulphate, zinc borate, zinc sulfate, magnesium hydroxide, mica, vermiculite, quart, talc, wollastonite, diatomaceous earth, pumice, synthetic silica, silica gels, synthetic aluminosilicates, barium sulphate, calcium carbonate, clay, exfoliated clays, antioxidants, stabilizers, lubricants, and mixtures thereof.

It has unexpectedly been found by the present inventors that the expanded perlite is effective in the polymer composition, according to the present invention, over a broad range of particle sizes. For example, expanded perlite with a much higher mean particle size (e.g. a $d_{50}$ of greater than about 20 μm gives similar results (including in connection with: tensile strength, elongations at break and tear strength) to that of expanded perlite having a much smaller mean particle size (e.g. a $d_{50}$ of about 12 μm) and other known fillers of similar or even smaller particle size distributions (e.g. MT Black 990 with a reported $d_{50}$ of 280 nm).

In this respect, particle size is one parameter of functional fillers which determines what properties the filler will impart to the material being filled. Generally, functional fillers transfer applied stress from the elastomer matrix to the strong and stiff mineral. Thus, conventionally, it is thought that this stress transfer will be better effected if the mineral particles are smaller, because greater surface is thereby exposed for a given mineral concentration.

If the size of the filler particle greatly exceeds the polymer inter-chain distance, it is hypothesized that areas of localized stress can be introduced that could contribute to elastomer chain rupture on flexing or stretching. Presently, fillers with particle sizes greater than about 10 μm are therefore usually avoided because they can reduce performance rather than extend or reinforce.

Fluoroelastomers

The fluoroelastomer polymer to be filled in accordance with the present invention includes homopolymers and/or copolymers, as well as cross-linked and/or entangled polymers.

The term "precursor" as applied to the fluoroelastomer polymer component will be readily understood by one of ordinary skill in the art. For example, suitable precursors may include one or more of: monomers, cross-linking agents, curing systems comprising, for example, cross-linking agents and promoters, or any combination thereof.

Fluoroelastomer polymers, including homopolymers and/or copolymers, comprised in the polymer composition of the present invention may be prepared from one or more of the following monomers: vinylidene fluoride (VF2), vinyl fluoride (VF), perfluoroalkylvinyl ethers such as perfluoromethylvinyl ether (PFMVE) and perfluoropropylvinyl ether (PFPVE), tetrafluoroethylene (TFE), chlorotrifluoroethylene (CTFE), bromotrifluoroethylene (BTFE), trifluoroethylene (TriFE), hexafluoropropylene (HFP), perfluoroalkoxy (PFA), fluoroethylene (FE), bromoperfluoroethylvinyl ether, iodotetrafluorobutene, hydropentafluoropropene, perfluorocyclobutene, perfluoro(methylcyclopropene) ethylene, propylene, butylene, and isobutylene.

The fluoroelastomer polymer component may be selected from one or more of polytetrafluoroethylene (PTFE) (a homopolymer of TFE), fluorinated ethylene-propylene (FEP) (a copolymer of TFE and HFP), perfluoroalkoxy (PFA) (a copolymer of TFE and PFPVE), MFA polymer (a copolymer of TFE and PFMVE), polychlorotrifluoroethylene (PCTFE) (a homopoymer of CTFE), polyvinylidene fluoride (PVDF) (a homopolymer of VF2, or a copolymer of VF2 and HFP), polyvinyl fluoride (PVF) (a homopolymer of VF), ethylene tetrafluoroethylene (ETFE) (a copolymer of TFE and ethylene), ethylene chlorotrifluoroethylene (ECTFE) (a copolymer of ethylene and CTFE), THV polymer (a terpolymer of TFE, HFP and VF2), vinyl fluoride-hexafluoropropylene copolymer, vinyl fluoride-hexafluoropropylene-tetrafluoroethylene terpolymer and propylene tetrafluoroethylene (a copolymer of TFE and propylene).

The polymer composition of the present invention may also include other elastomer polymers such as nitrile based elastomers, EPDM (Ethylene Propylene Diene Monomer) elastomer and fluorosilicone based elastomers.

Preparation of the Fluoroelastomer-Perlite Compositions

The polymer composition of the present invention comprising fluoroelastomer and expanded perlite is prepared by combining fluoroelastomer with an expanded perlite.

The expanded perlite combined with the fluoroelastomer may have a $d_{50}$ of less than about 100 μm. The $d_{50}$ of the expanded perlite may be less than about 80 μm, less than about 60 μm, less than about 40 μm, less than about 30 μm, less than about 25 μm, less than about 20 μm, less than about 15 μm, less than about 10 μm, less than about 8 μm, less than about 6 μm, or less than about 3 μm. The value of $d_{50}$ may be as low as 1 μm, or even as low as 0.5 μm. The value of $d_{50}$ of the expanded perlite may be between about 3 μm and about 60 μm, for example, between about 6 μm and 40 μm, between about 6 μm and 30 μm, or between about 10 μm and 25 μm.

Preparation of the Polymer Compositions of the Present Invention can be accomplished by any suitable mixing method known in the art, as will be readily apparent to one of ordinary skill in the art.

Such methods include dry blending of the individual components or precursors thereof and subsequent processing in a conventional manner. Certain of the ingredients can, if desired, be pre-mixed before addition to the compounding mixture.

In the case of thermoplastic fluoroelastomer compositions, such processing may comprise melt mixing, either directly in an extruder for making an article from the composition, or pre-mixing in a separate mixing apparatus. Dry blends of the individual components can alternatively be directly injection moulded without pre-melt mixing.

The polymer composition can be prepared by mixing of the components thereof intimately together. The said expanded perlite material may then be suitably dry blended with the fluoroelastomer polymer and any desired additional components, before processing as described above.

For the preparation of cross-linked or cured fluoroelastomer polymer compositions, the blend of uncured components or their precursors, and, if desired, the expanded perlite and any desired non-perlite component(s), will be contacted under suitable conditions of heat, pressure and/or light with an effective amount of any suitable cross-linking agent or curing system, according to the nature and amount of the fluoroelastomer polymer used, in order to cross-link and/or cure the fluoroelastomer polymer.

For the preparation of polymer compositions where the expanded perlite and any desired other component(s) are present in situ at the time of polymerisation, the blend of monomer(s) and any desired other fluoroelastomer polymer precursors, expanded perlite and any other component(s) will be contacted under suitable conditions of heat, pressure and/or light, according to the nature and amount of the monomer(s) used, in order to polymerize the monomer(s) with the expanded perlite and any other component(s) in situ. For example, where expanded perlite material is mixed with precursors of the fluoroelastomer polymer, the fluoroelastomer polymer will subsequently be formed by curing and/or polymerising the precursor components to form the desired fluoroelastomer polymer.

The polymer compositions may be prepared by compounding using any of the usual mixing devices such as roll mills and internal mixers. Generally, the temperature of the mixture being compounded should not rise above about 120° C.

For example, the polymer composition may be prepared by compounding on a two-roll mill, at temperatures between about room temperature and about 100° C., for example, between about 45° C. and 65° C. The mill is adjusted to rotate at the desired speed, and pre-formed fluoroelastomer is added. Processing aids, such as Carnauba wax, can be added also. Generally, a rise in temperature will occur due to the shear forces generated. The expanded perlite is then added. Preferably, the expanded perlite is added as quickly as it can be absorbed by the fluoroelastomer.

The mill can be adjusted to allow cross cutting and blending until a substantially homogeneous crepe is achieved. The crepe is then removed (e.g., by cutting) from the mill for subsequent processing. Then, for example, the resulting blend can be further compression moulded or injection moulded into useful shapes.

Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate calcium oleate and zinc palmitate.

The resulting blend may then be cured. Suitable curing conditions will be readily apparent to one of ordinary skill in the art.

Suitable curing agents include diamine, dihydroxy and peroxide based agents. Diamine based cure agents (such as hexamethylene diamine carbamate) and peroxide based cure agents (such as 2,5-dimethyl-2,5-di(t-butyl peroxy) hexane/triallylisocyanurate) are typically added during compounding of the fluoroelastomer and the filler. Dihydroxy based cure agents (such as hexafluoropropylidene dipehnol) are typically added to the fluoroelastomer during preparation of the fluoroelastomer (i.e. prior to any subsequent compounding).

Curing temperatures typically range from room temperature to 250° C., and for a period of time usually determined by pre-curing rheometry. The polymer composition comprising fluoroelastomer and expanded perlite blend may be first press cured under pressure at a temperature in the range of from about 50-200° C., for example about 100-200° C., or for example, about 160-190° C. Press curing may last for up to about 30 minutes, for example, less than about 20 minutes, or for example less than about 10 minutes.

The press cured blend may then be subjected to a post cure (typically at atmospheric pressures) at a temperature of up to about 250° C., for example about 230° C., for about 12-24 hours, for example about 16-20 hours, or for example, about 18 hours.

These polymer systems typically contain trace amounts of acids (which during processing can produce undesirable side effects, e.g., color instability, odour, physical degradation, irregular cure patterns or corrosion of processing equipment). Thus, an acid acceptor or scavenger, typically in the form of a metal oxide or hydroxide, may be incorporated during processing of the fluoroelastomer-expanded perlite composition.

In addition, other additives commonly used in fluoroelastomer compounding and processing may be added. Typical additives include plasticizers, processing aids, antioxidants, water acceptors and pigments. The amount of such additives added will depend on the particular uses of the final compositions, as will be readily apparent to one of ordinary skill in the art.

In some embodiments, preparation of the fluoroelastomer-perlite compositions of the present invention comprises milling the composition comprising the fluoroelastomer and expanded perlite prior to molding and curing of the filled polymer. One of the main purposes of the milling is to establish a uniform distribution of the components (and any additional additives) throughout the polymer composition.

Uses of the fluoroelastomer-perlite compositions

The expanded perlite can be combined with fluoroelastomer as filler. The expanded perlite can also be combined with fluoroelastomer as functional filler for the purpose of preserving or improving upon the physical, mechanical, thermal and/or electrical properties of the fluoroelastomer. In particular, the expanded perlite can be combined with fluoroelastomer in order to preserve or improve upon the resistance of the fluoroelastomer to one or more of chemicals, fuels, oils and/or heat.

The fluoroelastomer-perlite compositions of the present invention can be processed to form, or to be incorporated in, articles of commerce in any suitable way.

Such processing may include compression moulding, injection moulding, gas-assisted injection moulding, calendaring, vacuum forming, thermoforming, extrusion, blow moulding, drawing, spinning, film forming, laminating or any combination thereof. Any suitable apparatus may be used, as will be apparent to one of ordinary skill in the art.

The articles which may be formed from the compositions are many and various. Examples include O-ring seals in fuels, lubricants and hydraulic systems, shaft seals, valve stem seals, fuel injector O-rings, fuel hoses, valve and manifold gaskets, fuel tank bladders, firewall seals, diaphragms, electrical connectors, roll covers and lining in fuel lines.

One preferred application of the fluoroelastomer-expanded perlite composition of the present invention is as a lining in fuel lines. In this respect, and without wishing to be bound by theory, it is believed that the high shear during milling of the fluoroelastomer-expanded perlite may break down the perlite structure to that of a more plate like structure, which may improve fuel barrier characteristics by creating a tortuous path for any fuel penetration. Moreover, as the production method of such linings is typically by extrusion, the perlite plates will become aligned in the direction of the extrusion giving good dispersion to provide good barrier effects.

The invention will now be illustrated by reference to the following non-limiting examples.

EXAMPLES

In this example, filler samples were used as follows:

Perlite A (a "baghouse" product from Milan, Italy, unmilled E50 expanded perlite);

Perlite B (Harborlite 200 Escondido, an expanded perlite commercially available from World Minerals, Inc.);

Perlite C (Harborlite 200 Vicksburg, an expanded perlite commercially available from World Minerals, Inc.);

Perlite D (OptiMat 1430™, an expanded perlite commercially available from World Minerals, Inc.);

MT Black N990 (a carbon black commercially available from Cancarb™; Canada)-MT Black N990 is a filler specifically designed for fluoroelastomers;

Superfloss™ (a flux calcined diatomite commercially available from Celite™).

These filler samples were tested in a fluoroelastomer formulation. The following formulation was used (parts by weight):

| | |
|---|---|
| Dyneon™ FC 2181, (a copolymer of vinylidene fluoride and hexafluoropropylene) | 100 parts |
| filler | 15/30/45/60 parts |
| calcium hydroxide (acid acceptor) | 6 parts |
| magnesium oxide (acid and water acceptor) | 3 parts |
| carnauba wax (processing aid) | 1 part |

Particle size distribution, physical properties and mineralogical analysis of these filler samples are shown in Tables 1, 2 and 3, respectively. For example, in Table 1, Perlite A has a $d_{50}$ of 21.2 μm.

All of the filler samples, apart from MT Black N990 were dried at 110° C. for about 1 hour, prior to compounding.

All compounding was accomplished on a two-roll mill with variable speed control of each roller. Temperature was controlled between 45° C. and 65° C. (by running water through the rollers).

The first stage in compounding was to set the mill rotating at a moderate speed, to minimize the gap and to add all the cut pieces of the fluoroelastomer. The gap was then adjusted in the standard fashion to achieve a 'crepe' on one of the rolls and a small 'bank' between. After about three minutes, and an increase in temperature due to the shear forces generated, the filler was added as quickly as it could be absorbed, followed by 'knifing' to assist distribution. After about a further 5 minutes the calcium hydroxide, magnesium oxide and the carnauba wax were added and incorporated, the roll gap being adjusted to allow cross cutting and blending. During this time, the temperature increased, particularly at higher filler loadings. Once a homogeneous crepe had been achieved after a total time of about 30 minutes, the 'crepe' was cut from the mill, stored for two hours, and then followed by the second stage compounding by re-milling for 10 minutes (to maximize the dispersion of the filler). The crepe from the second stage was cut from the mill for subsequent processing.

A small sample of each 'crepe' was tested in a Monsanto rheometer at 177° C. to establish cure conditions for each compound. Press curing was at 177° C. under pressure for a time that was determined (in accordance with ASTM D 2084) from a Monsanto rheometer (Monsanto Moving Die Rheometer-100 cpm, 0.5 degree arc). Post cure was at 230° C. for 18 hours in air. Heat aging was at 230° C. for 72 hours.

The rheological properties of the filled samples are shown in Table 4.

Properties of Post Cured Sheets

All compounds were press-cured, based on the time in Table 4 and post-cured at 230° C. for 18 hours in air to develop maximum tensile strength and compression set resistance. Mechanical properties of all compounds with 30 phr and 45 phr loadings after post cure are presented in Table 5.

Tensile testing in accordance with BS903 Pt. 2 was carried out using a H10KS Tensometer with a 1000 N load cell and a 500 N laser extensometer at a testing speed of 500 mm/min. The load range used was 100 N.

Compression set testing was carried out in accordance with ISO 815. The compression set time was 72 hours and the temperature was 200° C.

Tear testing was carried out in accordance with ISO 34, BS903:

TABLE 1

Particle size distribution, μm (% undersize)

| Sample ID | 0% | 10% | 20% | 30% | 40% | 50% | 60% | 70% | 80% | 90% | 95% | 100% | Manufacture reported $d_{50}$ |
|---|---|---|---|---|---|---|---|---|---|---|---|---|---|
| Perlite A | 2.0 | 6.3 | 9.4 | 13.0 | 16.9 | 21.2 | 26.3 | 33.1 | 42.6 | 58.9 | 76.8 | 228 | |
| Perlite B | 2.3 | 6.7 | 9.6 | 13.2 | 16.9 | 20.8 | 25.2 | 30.9 | 39.0 | 53.3 | 76.8 | 192 | |
| Perlite C | 1.2 | 3.9 | 5.7 | 7.5 | 9.5 | 12.1 | 15.2 | 18.6 | 23.1 | 31.1 | 40.6 | 114 | |
| Perlite D | 2.3 | 6.5 | 8.9 | 11.5 | 14.4 | 17.3 | 20.3 | 23.8 | 28.7 | 37.4 | 47.6 | 125 | |
| Superfloss | 0.9 | 2.7 | 4.1 | 6.5 | 6.8 | 8.4 | 10.4 | 13.2 | 16.9 | 23.1 | 30.4 | 74.0 | |
| MT Black N990 | | | | | | Unable to measure* | | | | | | | 280 nm |

*MT Black was unable to measure because it contaminated sensor of PSD analyzer.

TABLE 2

Mineralogical analysis

| Sample ID | $Na_2O$ | MgO | $Al_2O_3$ | $SiO_2$ | $P_2O_5$ | S | $SO_2$ | Cl | $K_2O$ | CaO | $TiO_2$ | MnO | $Fe_2O_3$ | F | TOTAL |
|---|---|---|---|---|---|---|---|---|---|---|---|---|---|---|---|
| Perlite A | 3.38 | 0.188 | 14.91 | 74.49 | 0.0421 | | | 0.0472 | 4.91 | 0.819 | 0.111 | 0.0557 | 0.748 | 0.177 | 99.9 |
| Perlite B | 3.55 | 0.137 | 14.22 | 75.13 | 0.0138 | | | 0.0430 | 5.47 | 0.567 | 0.0963 | 0.0756 | 0.655 | | 100.0 |
| Perlite C | 3.44 | 0.309 | 14.61 | 74.54 | 0.0203 | | | 0.0354 | 5.09 | 0.786 | 0.103 | 0.0776 | 0.680 | 0.236 | 99.9 |
| Perlite D | 3.44 | 0.183 | 15.18 | 74.32 | 0.0405 | | | 0.0305 | 4.95 | 0.836 | 0.119 | 0.0579 | 0.720 | | 99.9 |
| Superfloss | 2.81 | 0.451 | 2.56 | 92.01 | 0.168 | 0.0123 | | 0.0272 | 0.378 | 0.298 | 0.117 | 0.0051 | 1.100 | | 99.9 |
| MT Black N990 | 0.13 | 0.00 | 0.01 | 0.18 | 0.02 | 0.09 | | 0.03 | 0.01 | 0.01 | 0.01 | 0.00 | 0.02 | | 0.6 |

TABLE 3

Physical properties

| Sample ID | Perlite A | Perlite B | Perlite C | Perlite D | Superfloss | MT Black N990 |
|---|---|---|---|---|---|---|
| Surface area, BET ($m^2/g$) | 4.5 | 5.1 | 3.3 | 4.8 | 3.1 | 9.3 |
| Porosimetry | | | | | | |
| Total intrusion Volume (mL/g) | 4.6 | 3.6 | 4.7 | 5.6 | 3.5 | 0.9 |
| Pore D (μm) | 5.1 | 13.6 | 5.5 | 11.7 | 3.1 | — |
| Porosity (%) | 87 | 69 | 89 | 76 | 84 | 58 |
| Colour | | | | | | |
| L | 90.7 | 90.8 | 92.0 | 91.9 | 96.5 | 21.2 |
| a | 0.9 | 0.8 | 0.5 | 0.5 | 0.1 | 0.1 |
| b | 3.8 | 3.5 | 2.6 | 2.8 | 2.1 | −0.1 |
| Blue light | 77.4 | 77.9 | 81.3 | 80.8 | 90.3 | 4.6 |
| Green light | 82.8 | 82.8 | 84.9 | 84.7 | 93.2 | 4.5 |
| Wet Density ($lb/ft^3$) | 15.6 | 17.8 | 15.6 | 13.8 | 23.6 | 39.7 |
| St. Dev. | | | | | 0.6 | 0.9 |
| Oil Absorption % | 206.9 | 201.0 | 176.7 | 226.6 | 148.9 | 58.3 |
| St. Dev. | 7.9 | 3.2 | 1.9 | 4.6 | 1.6 | 2.4 |
| Water Absorption (%) | 264.0 | 209.3 | 242.0 | 288.0 | 167.3 | 90.7 |
| St. Dev. | 6.9 | 3.1 | 2.0 | 3.5 | 1.2 | 1.2 |
| Hegman (oil) | 1.0 | 2.7 | 0.5 | 4.5 | 5.5 | N/A |

TABLE 4

Rheological properties at 177° C.

| Filler (phr) | ML Inch-lb | $ts_2$ min | $t_{50}$ min | $t_{90}$ min | MH Inch-lb | CURE TIME min |
|---|---|---|---|---|---|---|
| NONE (FC 2181) | 10 | 1.5 | 2.5 | 11 | 80 | 14 |
| MT BLACK N990 (30) | 13 | 1.25 | 2 | 4 | 106 | 5 |
| MT BLACK N990 (45) | 14 | 1.5 | 2.5 | 4 | 124 | 6 |
| Perlite A (15) | 11 | 1.25 | 2.25 | 4 | 93 | 5 |
| Perlite A (30) | 16 | 1.5 | 2.25 | 3 | 112 | 6 |
| Perlite A (45) | 16 | 1.5 | 2 | 4 | 122 | 5 |
| Perlite A (60) | 13 | 1.5 | 2.5 | 4 | 112 | 5 |
| Perlite B (30) | 15 | 1.5 | 2 | 2.5 | 116 | 5 |
| Perltie C (30) | 14 | 1.75 | 2.5 | 3.5 | 112 | 6 |
| Perlite D (30) | 12 | 1.5 | 2 | 3.5 | 108 | 5 |
| Perlite D (45) | 16 | 1.5 | 2.25 | 3 | 118 | 5 |
| SUPERFLOSS (30) | 16 | 1.5 | 2 | 2.5 | 126 | 6 |
| SUPERFLOSS (45) | 14 | 1.5 | 2 | 4 | 124 | 6 |

ML—minimum torque;
$ts_2$—time to 2 inch-lb rise from minimum torque;
$t_{50}$—time to 50% cure;
$t_{90}$—time to 90% cure;
MH—maximum torque

TABLE 5

Mechanical properties of compounds (standard deviation in brackets)

| FILLER (phr) | SHORE A | M25 (MPa) | M100 (MPa) | TENSILE (MPa) | ELONG (%) | TEAR (N/mm) | COMP. SET (%) |
|---|---|---|---|---|---|---|---|
| None (FC2181) | 53 | 0.6 (0.02) | 1.2 (0.04) | 8.4 (0.9) | 312 (30) | 15.0 (0.7) | 21.4 |
| MT Black N990 (30) | 71 | 1.5 (0.03) | 5.0 (0.07) | 13.9 (1.5) | 218 (17) | 35.9 (3.5) | 24.1 |
| MT Black N990 (45) | 79 | 2.1 (0.08) | 6.8 (0.5) | 13.9 (1.2) | 185 (23) | 39.1 (6.6) | 26.6 |
| Perlite A (15) | 63 | 1.0 (0.03) | 3.3 (0.15) | 10.8 (1.4) | 240 (38) | 33.0 (1.1) | 23.8 |
| Perlite A (30) | 75 | 2.2 (0.2) | 10.3 (0.5) | 13.8 (0.4) | 154 (15) | 41.5 (2.5) | 25.9 |
| Perlite A (45) | 79 | 3.4 (0.3) | 14.1 (0.7) | 15.7 (0.6) | 119 (11) | 46.6 (4.5) | 30.9 |
| Perlite A (60) | 82 | 3.9 (0.2) | 11.3 (1.0) | 11.3 (1.0) | 80 (13) | 44.6 (2.3) | 33.7 |
| Perltie B (30) | 74 | 1.9 (0.05) | 8.6 (0.4) | 12.3 (0.4) | 152 (11) | 47.0 (6.1) | 24.4 |
| Perlite C (30) | 73 | 2.0 (0.2) | 9.4 (0.9) | 14.5 (0.5) | 179 (16) | 41.4 (6.6) | 23.2 |
| Perlite D (30) | 77 | 2.4 (0.2) | 11.0 (0.4) | 13.7 (1.1) | 133 (14) | 46.6 (3.1) | 25.3 |
| Perlite D (45) | 81 | 4.8 (0.5) | 17.5 (0.1) | 16.9 (0.7) | 96 (11) | 46.9 (6.0) | 29.4 |
| SUPERFLOSS (30) | 74 | 1.6 (0.06) | 6.7 (0.4) | 13.0 (0.3) | 207 (17) | 40.7 (4.1) | 24.0 |
| SUPERFLOSS (45) | 74 | 2.2 (0.1) | 7.9 (0.4) | 10.3 (0.6) | 158 (14) | 43.2 (2.0) | 30.4 |

M25—Modulus at 25% elongation;
M100—Modulus at 100% elongation;
TENSILE—Tensile stress at yield;
ELONG—Elongation at break;
TEAR—the tensile force required to tear a pre-slit specimen;
COMP. SET—compression set

The invention claimed is:

1. A polymer composition comprising fluoroelastomer and expanded perlite, wherein the expanded perlite has an aspect ratio of 1:1 to 1:50 and a $d_{50}$ of less than 20 μm.

2. A polymer composition according to claim 1, wherein said composition comprises at least 15% by weight of an expanded perlite.

3. A polymer composition according to claim 1, wherein said composition comprises from about 15 to about 60% by weight of an expanded perlite.

4. A polymer composition according to claim 1, wherein said expanded perlite has a $d_{50}$ of less than 15 μm.

5. A polymer composition according to claim 1, wherein said expanded perlite has a $d_{50}$ of less than 8 μm.

6. A polymer composition according to claim 1, wherein said expanded perlite has a $d_{50}$ of less than 10 μm.

7. A polymer composition according to claim 1, wherein said expanded perlite has a $d_{50}$ of less than 6 μm.

8. A polymer composition according to claim 1, wherein said expanded perlite has an aspect ratio of 1:2 to 1:35.

9. A polymer composition according to claim 1, wherein the fluoroelastomer is prepared from one or more of the following monomers: vinylidene fluoride (VF2), vinyl fluoride (VF), perfluoroalkylvinyl ethers such as perfluoromethylvinyl ether (PFMVE) and perfluoropropylvinyl ether (PF-PVE), tetrafluoroethylene (TFE), chlorotrifluoroethylene (CTFE), bromotrifluoroethylene (BTFE), trifluoroethylene (TriFE), hexafluoropropylene (HFP), perfluoroalkoxy (PFA), fluoroethylene (FE), bromoperfluoroethylvinyl ether, hydropentafluoropropene, perfluorocyclobutene, perfluoro(methylcyclopropene), ethylene, propylene, butylene and isobutylene.

10. A polymer composition according to claim 1, wherein the fluoroelastomer is selected from one or more of polytetrafluoroethylene (PTFE), fluorinated ethylene-propylene (FEP), perfluoroalkoxy (PFA), copolymer of tetrafluoroethylene and perfluoromethylvinyl ether, polychlorotrifluoroethylene (PCTFE), polyvinylidene fluoride (PVDF), polyvinyl fluoride (PVF), ethylene tetrafluoroethylene (ETFE), ethylene chlorotrifluoroethylene (ECTFE), THV polymer, vinyl fluoride-hexafluoropropylene copolymer, vinyl fluoride-hexafluoropropylene-tetrafluoroethylene terpolymer, and propylene tetrafluoroethylene.

11. A polymer composition according to claim 1, wherein the particles of said expanded perlite are surface treated to modify one or more properties of the perlite.

12. A polymer composition according to claim 11, wherein the surface of the expanded perlite particles are surface modified by a silanization agent.

13. A polymer composition according to claim 12, wherein the silanization agent is selected from dimethyldichiorosilane, hexadimethylsilazane, butyltrichlorosilane, hexyltrichlorosilane, octyltrichlorosilane, octylmethyldichlorosilane, decyltrichlorosilane, dodecyltrichlorosilane, tridecyltrichlorosilane, dihexyldichlorosilane, dioctyldichlorosilane, octadecyltrichlorosilane, tributylchlorosilane, octyltriethoxysilane, octyltrimethoxysilane, chloropropyltrimethoxysilane, chloropropyltriethoxysilane, polydimethylsiloxane, 3-methacryloxypropyltriethoxysilane, vinyl trimethoxy silane, vinyl triethoxy silane, vinyltriisopropoxy silane, and mixtures thereof.

14. A polymer composition according to claim 12, wherein the silanization agent is selected from the group consisting of trimethoxysilyl ethyl amine, triethoxysilyl ethyl amine, tripropoxysilyl ethyl amine, tributoxysilyl ethyl amine, trimethoxysilyl propyl amine, triethoxysilyl propyl amine, tripropoxysilyl propyl amine, triisopropoxysilyl propyl amine, tributoxysilyl propyl amine, trimethoxysilyl butyl amine, triethoxysilyl butyl amine, tripropoxysilyl butyl amine, tributoxysilyl butyl amine, trimethoxysilyl pentyl amine, triethoxysilyl pentyl amine, tripropoxysilyl pentyl amine, tributoxysilyl pentyl amine, trimethoxysilyl hexyl amine, triethoxysilyl hexyl amine, tripropoxysilyl hexyl amine, tributoxysilyl hexyl amine, trimethoxysilyl heptyl amine, triethoxysilyl heptyl amine, tripropoxysilyl heptyl amine, tributoxysilyl heptyl amine, trimethoxysilyl octyl amine, triethoxysilyl octyl amine, tripropoxysilyl octyl amine, and tributoxysilyl octyl amine.

15. A polymer composition according to claim 11, wherein the surface of the expanded perlite particles are modified by an agent selected from the group consisting of triethanolamine (TEA), 2-amino-2-methyl-1-propanol, AMP-95™ (2-amino-2-methyl-1-propanol formulation containing 5% water), and mixtures thereof.

* * * * *

UNITED STATES PATENT AND TRADEMARK OFFICE
CERTIFICATE OF CORRECTION

PATENT NO. : 8,357,747 B2
APPLICATION NO. : 12/521574
DATED : January 22, 2013
INVENTOR(S) : Michael Greene et al.

It is certified that error appears in the above-identified patent and that said Letters Patent is hereby corrected as shown below:

Claim 13, col. 12, line 31, "dimethyldichiorosilane" should read --dimethyldichlorosilane--.

Signed and Sealed this
Twelfth Day of March, 2013

Teresa Stanek Rea
*Acting Director of the United States Patent and Trademark Office*